June 8, 1965   R. C. WEBB ETAL   3,188,627
SHAFT ANGLE ENCODING APPARATUS
Filed Jan. 30, 1962   5 Sheets-Sheet 1
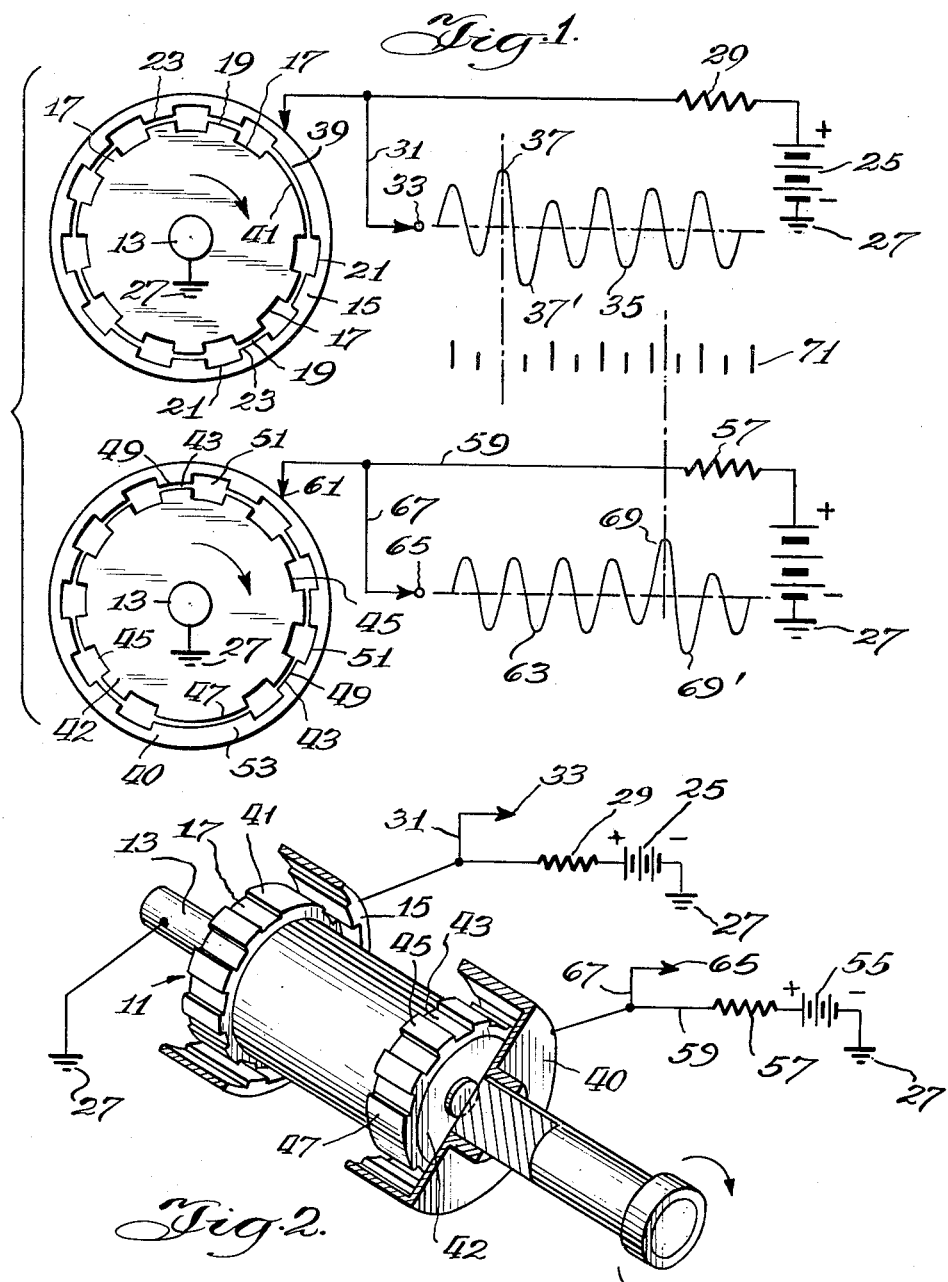
Inventors
Stanley B. Peterson
Rickard C. Webb
By Merriam, Smith & Marshall
Attorneys

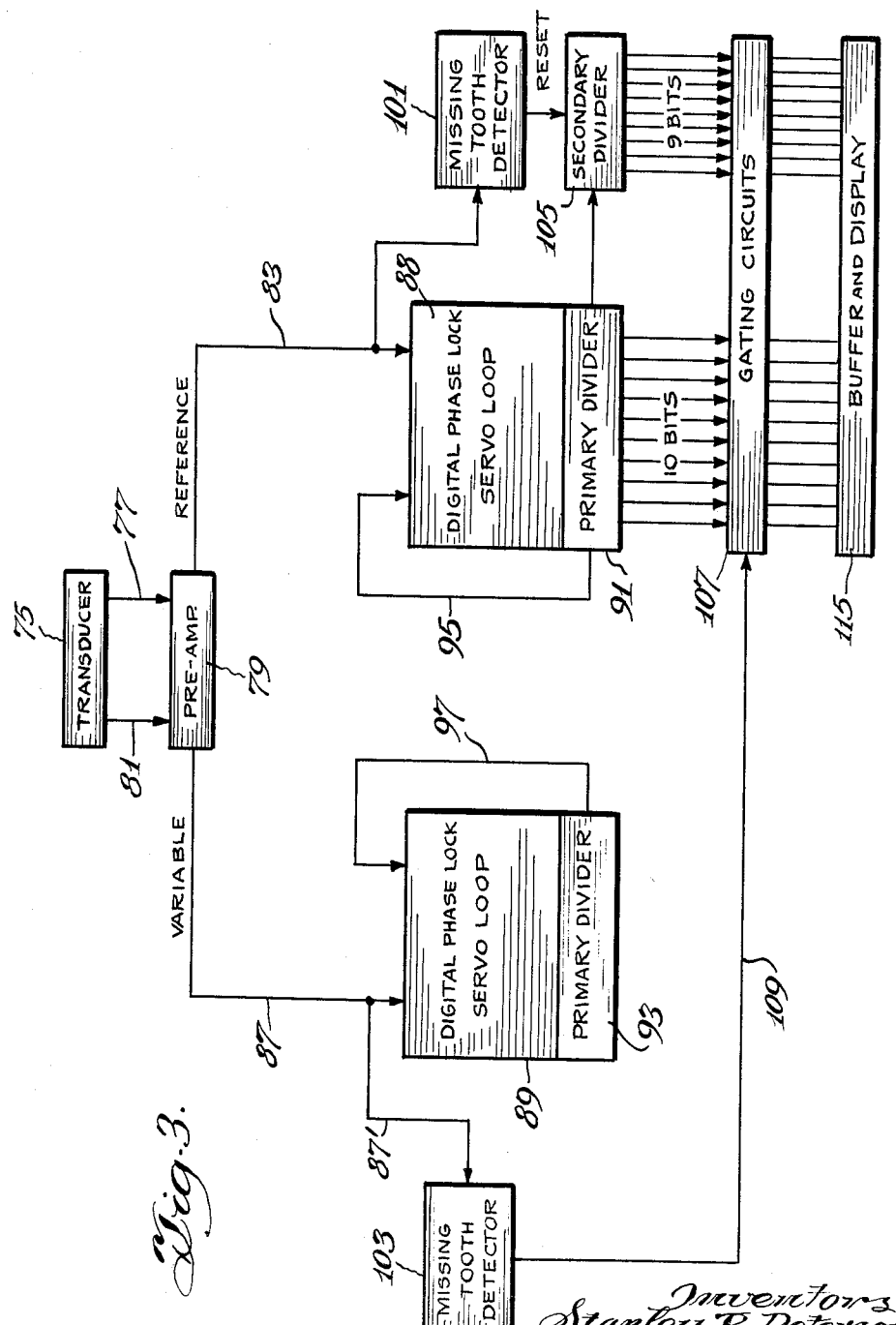

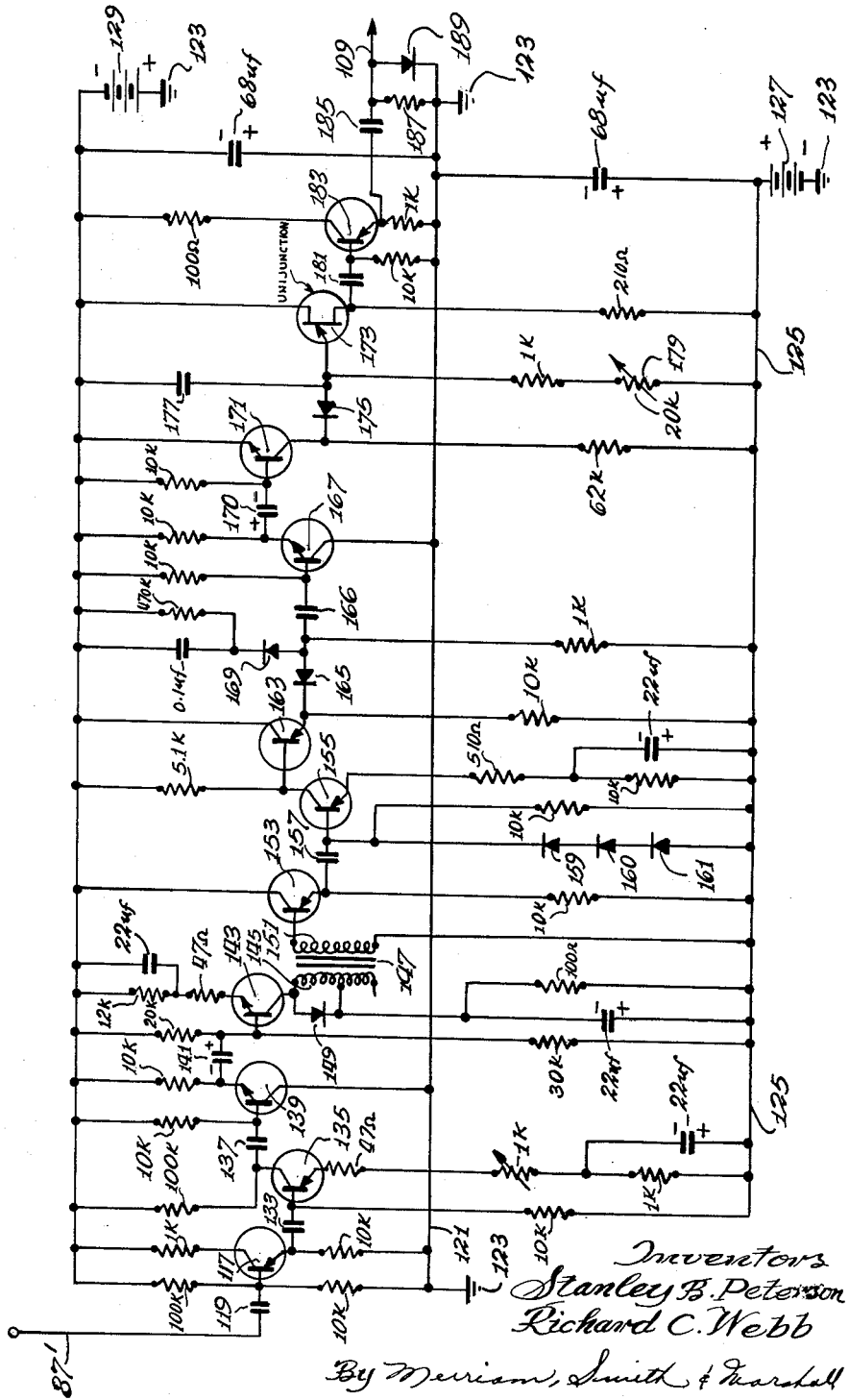

Inventors
Stanley B. Peterson
Richard C. Webb
By Merriam, Smith & Marshall
Attorneys

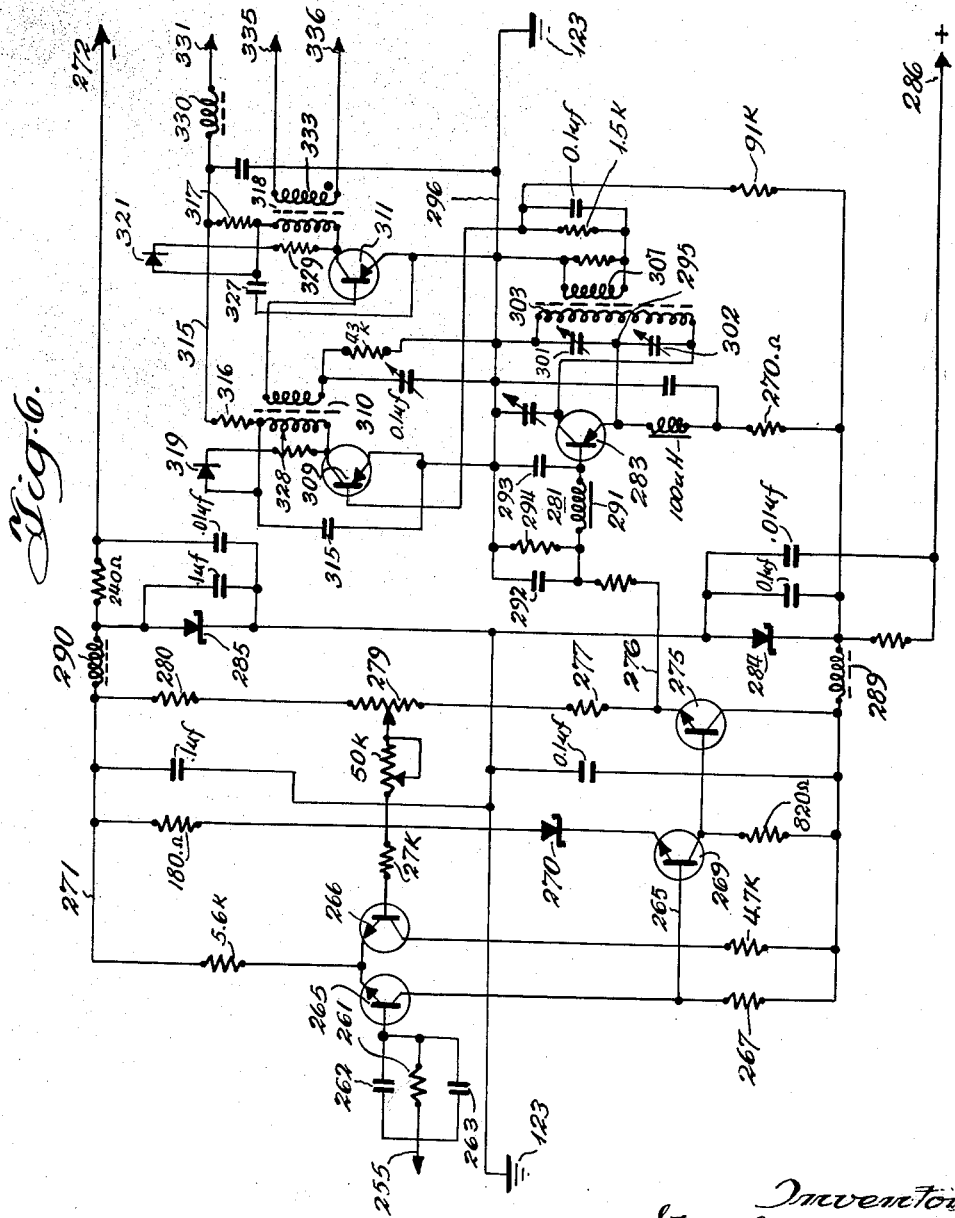

United States Patent Office 3,188,627
Patented June 8, 1965

3,188,627
SHAFT ANGLE ENCODING APPARATUS
Richard C. Webb and Stanley B. Peterson, Broomfield, Colo., assignors to International Telephone and Telegraph Corporation, New York, N.Y., a corporation of Maryland
Filed Jan. 30, 1962, Ser. No. 169,715
10 Claims. (Cl. 340—347)

This invention relates to apparatus and circuitry for providing a continuous measurement and digital encoding of changing of angular relationships of two elements relative to each other by a differentiation of the relative phase difference between two signal waves or electrical signals which are substantially identical but subject to variable phase-angle relationships to each other.

The invention constitutes an improvement on the circuitry and apparatus disclosed in U.S. patent application of Richard C. Webb, Serial No. 797,264, filed March 4, 1959, and entitled, "Angle Encoding Apparatus."

The invention finds a principal application in the digital encoding of the relative phase difference between two electrical waves generated under the control of a precision electrostatic or electromagnetic shaft-position-transducer device. Such a transducer develops a pair of electrical waves of known and selected frequency which are capable of being separately identified and which may be normally identical but so developed that the phase of one with respect to the phase of the other is subject to variation in accordance with an advancement or a retardation of the relative mechanical phase position of two components, as, for instance, determined by the rotation of a mechanical shaft.

The above mentioned electrostatic generating equipment provides two electrical waves which may be identified to provide a vernier interval of measurement which is readily obtainable. According to the present invention "coarse" angular data are obtained in such a way as to be capable of being transmitted without the use of additional wire lines.

As was the case with the application and disclosure hereinabove identified, the described apparatus is adapted for making continuous measurements of azimuth and elevation particularly in connection with optical tracking instruments and radar apparatus employed illustratively in guided missile range instrumentation. The invention also provides measurements of angular displacements of various components, registration of angular sets and various other allied and related features.

According to its broadest principles, the invention provides, in the measurement of electrical phase-angle shifts, a mechanism whereby two electrical signals whose relative phase is to be measured can be related to selected harmonics of a sufficiently high order to permit the harmonic frequencies to be used as a time-measuring scale for fractional portions of one of the electrical signals. The invention is adapted to assume various forms and characteristics but, in one of its preferred forms, it is illustrated schematically and diagrammatically by the accompanying drawings wherein:

FIGS. 1 and 2 illustrate respectively a static signal generator provided with a rotor and a fixed stator, and a rotor and a movable stator with the movement of the stator determined by the mechanical angular shift of one component with respect to another;

FIG. 3 is a schematic ciricuit diagram of a data processing system controlled by the signal wave forms as developed by the generators of FIGS. 1 and 2 respectively;

FIG. 4 is a circuit diagram of one form of missing tooth detector equipment;

Figure 5:
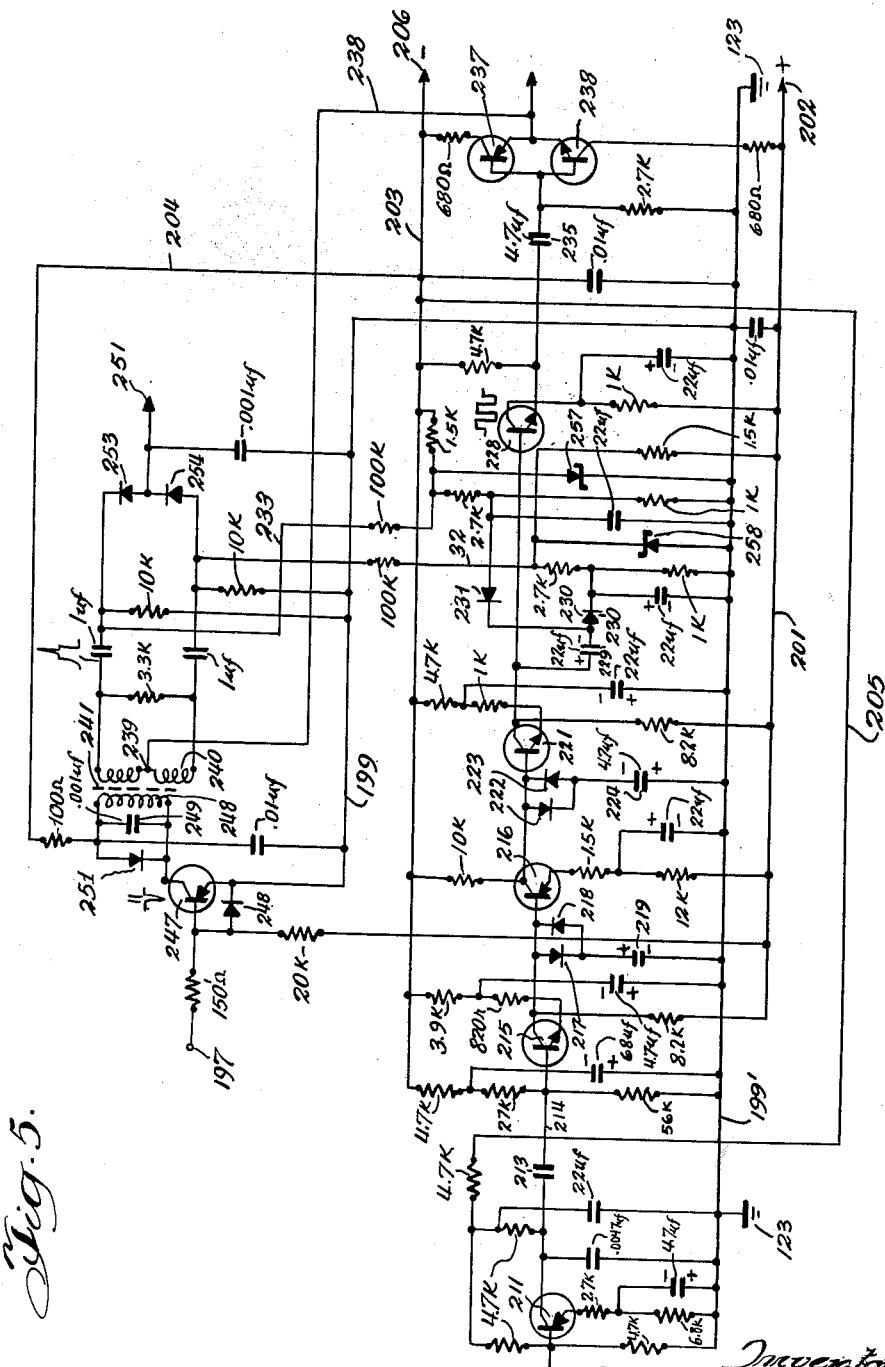
FIG. 5 is a schematic circuit diagram of a phase detecting and squaring amplifier circuit; and, FIG. 6 is a schematic circuit diagram of a suitable oscillator and control amplifier for use with the diagrammed circuit of FIG. 3.

Considering, first of all, FIG. 1 of the drawings, signals of a fixed frequency and reference phase are developed by a combination of a rotor element 11 positioned to turn, with rotation of a grounded shaft 13, and to move internally of and relative to a stator element 15. The rotor element 11 is adapted to be driven by any suitable prime mover at a substantially constant speed which illustratively may be assumed as 1000 r.p.m. The rotor element is formed with a multiplicity of peripheral serrations 17 so that the combination of the serrations and the unrecessed peripheral regions 19 make the component appear in much the shape of an ordinary spur-gear. The diagrammatic showings of FIGS. 1 and 2 of the generator is an end view and it will be understood, of course, that the rotor elements have a reasonable amount of depth such as has been shown for rotor element of the character depicted by the companion application hereinabove named.

The stator element 15, within which the rotor turns, likewise has serrated regions 21 and uncut peripheral regions 23. The stator element is adapted to mate with the rotor and is placed coaxially around the rotating element. The diameter of the inner peripheral regions 23 of the stator element 15 is sufficiently greater than the outer peripheral regions 19 of the rotor 11 to provide that the stator is always spaced away from the rotor by a separation sufficient to insure that no actual contact ever occurs between the two components as one is turned relative to the other.

In addition, the stator element 15, herein appearing more or less as a ring structure, is supported in any appropriate manner so as to be electrically insulated from the rotor element 11, as well as from all supporting structures. This element, which is an electrical conducting element, is supplied with a charging voltage from any suitable source, such as the schematically illustrated battery 25 (illustratively poled as indicated), so that with the source connected between ground 27 and the stator 15 through a charging resistance 29, the effect obtained when there is relative movement between the rotor 11 and the stator 15 is essentially equivalent to that of an electrostatic tone-wheel generator. Signal wave forms result when the so-called teeth 19 of the rotor pass under the teeth 23 of the stator and away therefrom over the recessed or cutaway portions 21. This brings about a change in the capacitance between the fixed stator and the grounded rotor as the various formed teeth move into positions which change the relative capacity of the two elements and, consequently, produce a change or variation in the charging current from the source 25 with the result that there appears, on the conductor 31, a waveform indication of this variation of charging current. The alternating current component of the charging current as it appears across the charging resistor 29, becomes available as a signal wave on the conductor 31. It is an essentially sinusoidal wave form whose amplitude, as will later be pointed out, is essentially constant except for one limited angular rotational range in each 360 mechanical degree rotation of the rotor element.

The general wave form available at the terminal point 33 is drawn adjacent to it and is supplied to conductor 31. As is evident from the drawing, this wave is essentially a sinusoidal wave 35 of which the amplitude of the cyclic variations is substantially uniform except at the region 37, 37′ and there it varies for a single cycle. The cyclic variation of the wave 35 at its substantially constant range of amplitude is produced as the rotor 11 turns relative to the stator 15 and exemplifies the fact that while the two elements move with respect to each other, the capacity changes between two limiting values. However, when that region 39 of the stator which has a long unserrated section and that region 41 of the rotor which has a similar unserrated section pass adjacent to each other, the capacity between the rotor and stator reaches a maximum value. Therefore, if it be assumed that the length of the uncut peripheral regions 39 and 41 correspond to two peripheral teeth, such as teeth 19 on the rotor and 23 on the stator, and one recessed portion, such as 17 on the rotor and 21 on the stator, there is generated during one cycle an output signal corresponding essentially to the wave form shown by the crests 37 and 37' assumed to be in the positive and negative directions, respectively.

This change comes about by the fact that at all other times with the particular relationship indicated by the rotor and stator there is one missing tooth on the rotor facing active teeth on the stator and there is one missing tooth on the stator facing active teeth on the rotor. However, during the time period when the two so-called "missing teeth" of the stator and rotor pass opposite to each other, all teeth on the stator and rotor become "active" with the result that there is generated a larger change in the capacitance than would otherwise be the case and hence a larger output voltage, as represented by the wave-form portion 37, 37' of that assumed wave drawn adjacent to the terminal point 33.

It will be appreciated that while indeed the single missing tooth provides a convenient means whereby one cycle of the signal wave form developed by the electrostatic generator can be exaggerated in amplitude in relation to all other cycles of the wave, other modifications of structure can be adopted to achieve the end objective and, of course, any number of teeth might be removed or added to the stator or rotor elements so as to make the wave form developed in the electrostatic generator such that one cycle of a group is readily distinguishable from all other cycles of the same group of oscillations which result when the rotor moves through 360° relative to the stator element. It is significant, however, that the selection of tooth arrangement of such a generator be such that where teeth are omitted, the exaggerated wave shall occur only once per revolution of the stator with respect to the rotor, at which instant all of the missing teeth align themselves with one another, thereby to produce a substantial change in the output signal voltage available at the output terminal 33. The pattern of the resultant wave form available at the terminal point 33 is such that the pattern of so-called "missing teeth" in the rotor and stator elements so functions that the combination acts somewhat like a "key and lock" to the extent that the effect of the so-called missing teeth is substantially insignificant until a unique relationship between the rotor and stator is achieved once during each revolution of the rotor when all of the missing teeth are simultaneously in alignment.

In some instances, the salient cycle formed by the wave crests 37 and 37' may be generated by means of a set of magnetic pulse generating elements which are mounted on and travel with the electrostatic elements formed by the rotor 11 and the stator 15. In this case, once during each revolution of the rotor the magnetic elements produce a narrow pulse generally similar to one cycle of the regularly produced electrostatic wave form 35 and thus simulate the change in amplitude of one cycle of the wave as diagrammatically shown at 37 and 37'. In this respect the developed pulse is caused to modulate one cycle of the wave form 35 to provide the effective change in amplitude or, if desired and if additional connecting lines are to be used, the pulse may be taken directly from the magnetic element on a separate wire line.

With the development of the signalling wave 35 and its changing amplitude, as above explained, for the reference voltage, a similar mechanism may be provided for generating and developing the variable voltage indicative of a shift in the angular relationship of one shaft component to another. This general form of component is depicted by FIG. 2 where, in contrast to a permanently fixed and stable stator element 15, a so-called movable stator element 40 is provided and used in combination with a rotor element 42 which is affixed to the operating shaft 13 with which the rotor element 11 is adapted to turn. As can be seen from the showing of FIG. 2, the rotor element 42 is provided with peripheral sections 43 and recessed sections 45 which form teeth, as described in connection with the rotor-stator combination of FIG. 1. Also, as above explained, the peripheral section 47 of the rotor which is a section of like relation to that shown at 41, lacks one recess and therefore in effect provides a "missing" tooth. Similarly, to the stator structure 15 of FIG. 1, the stator 40 is provided with peripheral sections 49 and recessed sections 51 which together form teeth corresponding essentially to the combination 21–23 of FIG. 1.

Also, the stator element is provided with an uncut peripheral section 53 which provides the effect of the so-called missing tooth. The angular extent of section 53 corresponding to that of the section 47 of the rotor.

Like the conditions explained in connection with FIG. 1, a source of charging voltage is provided by the schematically represented source 55 grounded at 27 and connected to the stator through the charging resistance 57 and the conductor 59. As was explained in connection with FIG. 1, with these conditions obtaining and charging current being available at the stator by way of the slideable connector or brush 61, a signal wave form 63 is developed to reach the terminal point 65 through the conductor 67 when the rotor 42 is rotated relative to the stator 40. Because of the so-called missing tooth and in the fashion above explained, one cycle of the developed wave form 63 has its amplitude accentuated as shown by the amplitude crests 69 and 69' in the positive and negative directions, respectively. From the foregoing standpoint the components of FIGS. 1 and 2 appear alike. However, as explained in the companion application Serial No. 797,264, hereinabove referred to, measurements of angular changes in order that a coarse relationship of angular shift may be observed are had by rotating the stator element 40 relative to the rotor 42. Any rotation of the stator 40 relative to its rotor 42 which brings the stator 40 out of angular similarity with respect to the stator 15 will produce a shift in the position or timing of the wave crests 69 and 69' of the wave 63 with respect to the crests 37 and 37' of the wave form 35. The phase separation between these two crests is indicative of the coarse angular shift of the sttor 40 with respect to the stator 15.

In the assumed conditions one cycle of the wave forms 35 and 63 is generated for each tooth formed on the stator and rotor elements so that, by computing the number of teeth peripherally arranged on the stator and rotor and knowing the rate of rotation of the rotor shaft 13, the normal frequency developed and represented by the waves 35 or 63 may readily be obtained. When the stator 40 is shifted relative to its rotor 42 and depending upon whether the shift is clockwise or counterclockwise, will determine the cyclic separation between the crests of the two developed waves. In the assembly illustrated by FIGS. 1 and 2 and referring to the separation of the crests 37 and 69 with respect to the schematically represented scale 71, it becomes apparent that the assumed relationship is such that the so-called missing tooth relationship of the rotor-stator combination 42, 40 is 3.25 teeth ahead of the rotor-stator combination 11, 15 of FIG. 1.

It has not herein been described but it will be apparent by reference to the companion application that various ways and means of maintaining relationship between the rotor 42 and stator 40 may be adopted and the developed signals available at the stator elements and in turn available at the terminal elements 33 and 65 may be used to obtain a very precise measurement of the angular movement of the movable stator 40 with respect to the fixed stator 15 within the pitch of the serrated teeth. When these two wave forms are developed the wave forms 35 and 63 contain information in the form of the increased amplitude cycle 37, 37' of wave form 35 and the increased amplitude cycle 69, 69' of the wave form 63 usable to obtain a precise identification of the coarse setting of the data shaft represented by the movable stator 40 relative to the fixed stator 15 in terms of the number of cycles of the reference signal with which the departure occurs. With this information available it then becomes desirable to be able to utilize and process the data furnished by the missing tooth signals to provide the coarse angular value, as well as the usual vernier information in the manner contemplated by the earlier disclosure.

Now making reference to FIG. 3 of the drawing, there is shown schematically and by block diagram form, utilization circuitry by which the reference and variable phase signals, as indicated by the wave cycle 37 and 37' of the wave 35 and the wave cycles 69, 69' of the wave form 63 are utilized so that the data processing circuitry can be activated. In the showing of FIG. 3 the combination of the two transducers formed by the generators comprising the stator and rotor combination 15 and 11 of FIG. 1 and 40 and 42 of FIG. 2 are assumed to be contained and included within the schematically shown transducer 75. The wave form available at the terminal 33 (FIG. 1) is available on conductor 77 to be fed to one part of the preamplifier 79. The wave form available at the terminal 65 (FIG. 1) is supplied to conductor 81 to be fed to a second part of the same preamplifier. The preamplifier 79 is a normal form of amplifier adapted to amplify in any suitable manner the signal wave form of the reference and variable signals available on the conductors 77 and 81 to be adapted to use to control the electronic processing data circuitry.

The amplified output signals from the preamplifier which are indicative of the reference signal 77 are provided by way of the conductor 83 to a digital phase lock servo loop circuit 85 and the variable phase wave signals which are like those on conductor 81 are supplied by conductor 87 to a generally similar digital phase lock servo loop circuit conventionally represented at 89.

The servo loop circuits 88 and 89 essentially comprise an oscillator component (as will be described with FIG. 6) which develops a relatively high frequency signal by means of any suitable form of oscillator. As in the earlier-filed application above referred to, these oscillators may be (although not necessarily) of the so-called Colpitts-type of which one (the reference signal generator) is accurately controlled as to frequency and of which the output of each is fed to a frequency-divider circuit such as the schematically represented primary divider 91 for the reference voltage and 93 for the variable voltage. In one assumed circuit the digital phase lock servo loop may comprise a generator developing a signal voltage of an assumed frequency of 5.24 megacycles per second which is controlled in phase in any suitable well-known manner by the signal voltage on the conductor 83 so as to lock with the reference signal. The output from this oscillator 85 when fed through the primary divider 91 is frequency divided to some suitable value in order to arrive at about the 1/1000 subharmonic thereof. In one convenient form this subharmonic frequency may bear a relationship of 1/2^10 (to provide the 1024th subharmonic) with respect to the master oscillator and the control then is affected by the feed-back loop provided by the conductor 95. Similarly, the digital phase-lock servo loop circuit and its generator 89, when fed through its similar divider circuit 93 may develop a similar subharmonic signal which is supplied by way of the signal conductor 97 to control the oscillator. This voltage is then controlled in its phase by means of the variable voltage available on the conductor 87 and thus the two servo loops develop signals of the assumed 5.24 megacycle value at their precise harmonics of the raw signal from each transducer 75 as appearing on conductors 77 and 81.

Each signal available on the conductors 83 and 87 is also supplied through a so-called missing tooth detector, such as the two components schematically represented at 101 and 102 which may function as peak detector or dipper and a pulse former from the signals to isolate the so-called "marked" cycles of oscillation (as represented by the wave cycles 37, 37' for the wave 35 and the cycle 69, 69' of the wave 63) produced by the missing tooth in the transducer components which have carried them to the missing tooth detector. The output signals from the missing tooth detector 101 are fed through a secondary divider circuit, schematically indicated at 105, which is an extention of the primary divider 91 of the reference loop and serves to provide a subharmonic of the supplied signal which divides by a number equal to the number of serrated teeth on the transducer elements so that the output of this divider, as supplied to the gating circuit 107, is a pulse frequency equal to that of the missing tooth signal which is also indicative and equal to the rotational rate of the rotor element 13.

The output from the missing tooth detector 103 which is subject to a phase variation relative to the reference voltage is supplied by a conductor 109 also to the gating circuit 107 and controls the operation of this gating circuit.

By utilizing the secondary divider circuit 105 in such fashion that it is reset regularly missing tooth signal available from the missing tooth detector 101 for the reference phase, this divider, together with the primary divider 91, provides a binary signal source which can supply digital data representative of angular measurements. In this read-out system the missing tooth signal from the variable phase channel through the conductor 87 and the missing tooth detector 103 and conductor 109 is utilized to gate into a buffer register circuit 115 the reading of the count registered in the coherent primary and secondary dividers 91 and 105 of the reference channel. This value constitutes the complete reading of the instrument at the time the read-out signal occurs so that by providing the missing tooth signals from the variable phase as available on conductor 109 to gate the readings of the reference counter into the buffer register once for each turn of the rotor, a new reading is available from the instrument once for each revolution of the rotor. It is, of course, apparent that switching may be provided to "read on command" if such requirement exists. Frequency divider circuits of various types are so well known in the art and since various known forms may here be used none will be specifically shown or diagrammed.

Reference may now be had to FIGURE 4 which describes one form of circuitry which the so-called missing tooth detector 103 may assume. As represented by the block diagram of FIG. 3, the signal output from the transducer 75 are supplied to any suitable form of amplifying circuit with the variable signals supplied on conductor 81 and the reference phase signals supplied on the conductor 77. These two signals are separately amplified and then supplied by way of the conductors 87 and 87' into a first emitter-follower stage 117 by way of a coupling condenser 119. In the circuit diagram of FIGURE 4 all points connected to the conductor 121 may be considered as connected to ground 123 as a reference point. Also, the circuitry of only one of the detector circuits 88 and 89 is shown since each may be alike.

Appropriate positive bias is applied, as will be later made apparent, by way of suitable connections to conductor 125 which illustratively may be assumed to be connected to a source 127 (schematically represented by a battery for convenience of showing) poled with its positive terminal connected to conductor 125 and its negative terminal grounded at 123. A suitable negative voltage may be provided for various components by connection of a source 129 to the conductor 131, with the source having its positive terminal grounded at 123. As the circuitry will herein be described, it may be considered for illustrative purposes that each of the sources 127 and 129 is a 12-volt source which has been found suitable for providing satisfactory operating potentials to the various components shown and particularly the various transistors, diodes, and the unijunction device.

The input signals supplied to the emitter-follower 117 which, as connected, provides a high input impedance to the network, are then supplied by the coupling condenser 133 to the base of the transistor 135. Suitable operating voltages are applied to this transistor in such fashion that the transistor serves to clip the input signal such, for instance, as the amplified version of either the wave 35 or the wave 63 (see FIGURE 1) depending upon whether the circuit of FIGURE 4 is used as the missing tooth detector 103 or as the missing tooth detector 101. The result is that the input signal supplied through the coupling condenser 137 to the emitter-follower 139 has the negative peaks thereof removed.

Output signals from the emitter-follower are provided and supplied by way of the condenser 141 to the base of an amplifying transistor 143 whose output is fed into the primary winding 145 of a transformer 147. Since amplification has occurred, it is desirable that any overshoot in the primary winding be damped out, and for this purpose a diode 149 is connected across the used primary winding 145 of the transformer. The transformer 147 is of the step-up variety. The stepped up voltage available in the secondary winding 151 is supplied to the base of the emitter-follower transistor 153 from which it is supplied to the base of an amplifying transistor 155, the coupling being provided through the condenser 157. In this instance it is well to mention that there is connected between the base of transistor 155 and the source of positive voltage one or more series connected diodes (three shown for convenience) at 159, 160 and 161, which connect to the conductor 125 and the source of positive voltage 127 so that at the base of the transistor 155 to which point the input signal is supplied it is possible to establish a set voltage. The transistor 155 functions as a signal clipper with its clipping level established by the voltage available at the connection with the cathode side of the diode 159 which is connected to the transistor base.

The amplified output from the transistor 155 which is available at its collector is then supplied to the base of the transistor 163 which functions as an emitter-follower and supplies its output signal through the diode 165 and coupling condenser 166 to the base of the transistor 167 which is also connected as an emitter-follower. The combination of diode 165 and the diode 169 functions as a level clamp on the signal supplied to the emitter-follower 167. The clamp combination is self-compensating.

The transistor 167 feeds a signal to transistor 171 through the coupling condenser 170. Also when operating as described, the transistor 167 serves to prevent loading of the diode clamp circuit 165, 169 by the circuit components following. The clamp circuit, as can be seen from the diagram, sets the desired clamp level. At the same time, the connection through the diode 165 serves to remove the positive peaks and spikes from the signal passed.

The output from the emitter-follower 167 is supplied through the coupling condenser 170 to the base of the amplifier transistor 171 which functions also as a peak detector device whereby the condition indicative of the produced pulses manifests itself. An output signal is developed which is fed through to the so-called unijunction conventionally shown at 173, this signal being fed to the base of the unijunction through the diode 175.

The negative conductor 131 connects to a storage capacity element 177 which charges through the combination of the fixed resistor 178 and the variable resistor 179 from the positive voltage connected to the conductor 175. The capacity of condenser 177 and the time constant of the combination of the capacitor 177 and the resistors 178 and 179 is such that in the time period between any two successive pulses applied through the diode 175 by way of the transistor 171 will provide a substantially linear increase in charge in the time period between successive pulses. However, as each pulse is received and is of sufficient magnitude and in a direction to produce a flow of current through the diode 175, the condenser 177 which has one terminal connected to the diode will discharge through the diode. At this time the unijunction 173 is of such characteristic that the voltage which is acquired by the plate of capacitor 177 connected to the anode of the diode 175 and to the base of the unijunction is insufficient to produce a flow of current through the unijunction. However, at time periods when the condition of the voltage wave which results from the missing tooth on the rotor-stator combination 11–15 or 40–42 permits the accumulated charge on the condenser 177 to reach a value which is approximately twice that acquired during the cyclic excursions of the input voltage wave available on conductors 77 or 81 from the transducer in the absence of the missing tooth condition. The next cycle of the transducer input is available to produce a conductive condition through the diode 175 and the voltage effective at the base of the unijunction 173 due to condenser 177 is sufficient to produce a flow of current there-through. Each voltage wave across condenser 177 is of saw-tooth shape and of an amplitude proportional to the relative relationship of the teeth on the rotors and stators of FIG. 1. The unijunction 173 becomes conductorial due to the increased voltage on the condenser, and to the increase in voltage from greater charge period.

Output from the unijunction 173 is then supplied from one of the output connections through the coupling condenser 181 to the emitter-follower 183 which serves primarily as a current amplifier to isolate the unijunction from the output load circuit. The output signal is shown in the schematic diagram of FIGURE 3 as appearing on the conductor 109. It is supplied to the conductor by way of the coupling condenser 185 and across the output resistor 187 which is shunted by the diode 189.

Many values of resistors and the like may be used without in any respect departing from the spirit of this invention, but for the purpose of indicating values which have been found suitable in operating those resistance components not specifically mentioned have been designated on the diagram by certain values which has been found to function satisfactorily. In these designations of values where the letter "K" is used it is intended to designate thousands of ohms. Resistances not otherwise marked may be assummed to represent merely ohms. Certain condensers which have been shown in the diagram but explanation of which is not considered to be necessary for an understanding of the invention have been represented as to approved size by suitable designations. Those condenser components which have been identified by numerals such as 119, 133, 137, 157, 166 and 181 may be suitably chosen as .1 f. Condensers shown at 141 and 170 have been found quite suitable when selected as 4.7 f. Condenser 177 is preferably small and about of a size of .022 f., and the coupling condenser 185 is preferably of a size about .001 f. The transistors 117, 153 and 183 are preferably of a type known as the 2N404. Transistors such as 135, 155 and 163 are preferably of the type 2N1307. Transistors such as 139, 143, 167 and 171 are preferably of the type 2N1306. The unijunction is of the type commonly identified as a 2N1671B. Diodes 149, 159, 160, 161 and 165 are preferably of the type known as T3G. Diodes 169 and 175 are preferably of the 5G221 type, while diode 189 has been found to function suitably when selected of the type T1G.

The electrical phase detector and squaring amplifier is more particularly shown by FIGURE 5 and will be found to be comprised in the schematically represented component 89 of FIGURE 3.

Making reference now to FIG. 5, signal inputs are provided at terminal 87' which correspond to those supplied to the missing tooth detector of FIG. 4 at the terminal 87' and represent the output from the pre-amplifier 79. A second signal input is also provided in the circuitry of FIG. 5 at the input terminal 197 which represents the signals supplied from the output of the primary divider circuit schematically designated at 93 in FIG. 3. In consideration of FIG. 5 it may for illustrative purposes be assumed that the conductor 199, as well as conductor 199', are connected to a point of fixed potential, such as the ground indicated at 123. Components to supply a positive operating potential relative to ground are connected to conductor 201. It may be assumed that the source of positive voltage (illustratively +12 volts) relative to ground is applied at terminal 202. Similarly, components to which a negative potential is applied connect with conductors 203, 204 and 205 and at terminal 206 are supplied with negative potential which may be assumed as −12 volts. For simplicity sake, further reference to connecting points with supplied potential to various components will not herein be made.

Considering first the connection of the input signal at terminal 87', it will be observed that the supplied pulse signals are fed to the base of an amplifier inverter 211 through the coupling condenser 212. The amplifier inverter has its emitter grounded. Its collector couples through coupling condenser 213 and conductor 214 to the base of the transistor amplifier 215. Output signals from the amplifier 215 are further amplified in the transistor amplifier 216. Across the input circuit to the amplifier 216 a pair of diodes 217 and 218 are connected at opposite polarity and then through the capacitor 219 to ground. The diodes, as connected, serve as limiters and control the clipping level of the signal input to the amplifier 216.

Similarly, output from the amplifier 216 is supplied from its collector to the base of a further amplifier 221, across the input of which a pair of diodes 222 and 223 connect in opposite polarity through a capacitor 224 to ground. These diodes are provided to establish the clipping level of the supplied signals. Output signals from the amplifier 221 are fed in two paths, one of which is by the way of conductor 227 to the base of the single end emitter follower 228. The same signals are also fed through the coupling condenser 229 and through the oppositely poled diodes 230 and 231 to be passed through conductors 232 and 233, respectively, across the combining circuit later to be described which will serve as the drive control for the oscillator to be described in connection with FIG. 6. The output from the single end emitter follower 228 is fed through condenser 235 to the double emitter follower to the base electrodes of the double emitter follower comprising transistors 237 and 238. The emitter electrodes of transistors 237 and 238 connect and through conductor 238 are applied in push-push fashion at the center tap 239 of the secondary winding 240 of transformer 241. The signal voltage at the single end emitter follower 228 is essentially a square wave, as is the voltage output from the double emitter followers 237 and 238.

At the input terminal 197, as above noted, signals at the frequency of the primary divider 93 are applied to the base of the amplifier 247 with the signal level determined by the clamp diode 248. The amplified output of the transistor 247 is then supplied to the primary winding 248 of transformer 241 which is appropriately tuned, if desired, by the capacitor 249 and damped by the diode 251. The signal wave form as supplied from the amplifier 247 of the primary 248 is essentially a sharp pulse extending in the negative direction. With the signals being applied and with the indicated connection of the double emitter-follower the pulse input from the counter is amplified appears on the pedestal formed by the square waves. When this signal is supplied through the diodes 253 and 254 to the output terminal 255 a signal is developed which is an attempt to drive an oscillatory circuit as described by FIG. 6.

The Zener diodes 257 and 258 stabilize and control the voltage available on the diodes 253 and 254.

Reference may now be made to FIG. 6 of the drawing in which the signal available at the terminal 255 is supplied to control the oscillator. This is the signal derived at a similarly numbered terminal in FIG. 5. These signals are supplied through a filtering network comprising series connected resistance 261 and its parallelly associated capacitors 262 and 263. The signals are supplied to the base of an amplifier transistor 265 with which there is also associated a second transistor 266 having its emitter connected to the emitter of transistor 265. Transistor 266 acts as a differential amplifier component and in a sense provides a cancellation against any tendency of the transistor 265 to drift. The amplified signal output from transistor 265 is applied across resistance 267 and through conductor 268 to the base of the transistor amplifier 269. The effective potential on the emitter of transistor 269 is fixed and set by the Zener diode 270 which connects from the emitter of the amplifier 269 to a conductor 271 upon which negative potential of a source (not shown) is connected at terminal point 272. The emitters of the transistors 265 and 266 also connect to the same conductor.

The output signal from the amplifier 269 is directly coupled to the base of an amplifier 275 connected as an emitter follower and supplying its output signal by way of conductor 276 and across its load resistor 277, 279 and 280 through the low pass filter 281 to the base of an oscillator 283. In this operation the Zener diodes 284 and 285 are connected between ground and the positive voltage supply source connected at terminal 286 in the case of the Zener diode 284 and between ground and the negative terminal 272 in the case of the negative voltage in Zener 285.

Suitable filtering is provided by the shunting condensers and it will be observed that each condenser sets and produces voltage which is independent of the power supply. Inductors 289 and 290 in the voltage supply connections to provide voltage for the operating components serve as smoothing elements. The input signals to control the oscillator 283, as stated, are fed through a low pass filter comprising the inductor 291 and the shunting capacitors 292 and 293, as well as resistor 294, all of which connect to ground. This filtering circuit serves to remove any spikes from the driving pulse and at the same time is of such characteristic as to by-pass the oscillator radio frequencies.

The oscillator 283 has its collector electrode connected to one end of the oscillatory circuit 295, the other end of the oscillatory circuit being connected to the ground conductor 296. The emitter of the oscillator 283 connects to the junction point of the condensers 301 and 302 which connect across the terminals of the inductance element 303 of the oscillator tank circuit.

It will be observed that the oscillatory circuit is connected as a Colpitts circuit. Its frequency is controlled by the tuning of the oscillatory circuit, its operation being determined by the input voltage applied to the base. The oscillator output frequency is then supplied through an inductive element 307 which is coupled to the oscillator inductance 303 and which supplies the oscillator output frequency through the conductor 308 to the base of the amplifier 309. The output from the amplifier 309 is supplied by a transformer 310 to a further amplifying stage 311 by connection to the base of the amplifier 311. The outputs from each of the amplifiers 309 and 311 are supplied from the primary winding of the transformer connected to the collector electrodes to an output conductor 315 through resistance elements 316 and 317. There is connected across the primary winding of each of the primary amplifiers 309 and 318 for amplifier 311 an appropriate damping diode 319 and 321, respectively, which serve to damp oscillation in the primary winding of the transformers 310 and 318. A bypass for high frequencies is provided in each circuit by the condensers 325 and 327. The combination of the damping diode elements 319 and its associated resistor 328 and the diode 321 and its associated resistor 329 serve to sharpen the output pulse of the oscillators that is amplified in the amplifiers 309 and 311 and supply said output pulse through the inductor 330 to an output terminal point 311. In order to drive the counting and gating circuits, shown at 107, the secondary winding of transformer 318 couples to the primary winding 333 and provides drive pulses at the terminals 335 and 336.

In the consideration of FIG. 5 the many components are shown by designations to indicate parameters which have been found to be workable. Illustratively, resistors shown by a numerical designation and the letter "K" represents a resistance of one thousand ohms. Other designations are standard in the art.

In the case of some of the components, however, where numerical identification of components has occurred, it it helpful to designate also particular components which have been found to be most desirable for the operation.

In FIG. 5, transistors designated by numbers 211 and 216 are preferably type 2N404. The transistor designated 215 is preferably a 2N167A. Transistors 221, 228 and 238 are preferably type 2N1306. Transistor 37 is preferably 2N1307, although 2N1306 is usable. Transistor 247 is type 2N1300. In the designated diodes 217, 218, 222, 223, 230, and 231 are preferably type SG221. Transistor 248 is preferably a T1G. Transistor 257 is preferably a T3G. Transistors 253 and 254 are preferably of the type FD835. The Zener diodes 257 and 258 are preferably type 651–C6.

The following designates capacitor elements not otherwise shown by parameters on the drawings:
212—0.1 μf.
213—0.022 μf.

If reference is now made to FIG. 6, various components there included may be identified insofar as sizes and the like are concerned as follows:

Capacitors 262 and 263 are preferably about 0.5 μf. Capacitors designated 292 and 293 are preferably about 0.1 μf.

Considering now resistor sizes for a preferred operation the following table for resistors not otherwise specifically designated is illustrative.

| | |
|---|---|
| 267—8.2K | 294—330 ohms |
| 277—1.5K | 328—68 ohms |
| 261—6.8K | 316—100 ohms |
| 279—1.0K | 329—68 ohms |
| 280—3.0K | 317—100 ohms |

Transistors 265 and 266 are preferably of the type 2N1974. Transistor 269 is preferably a type 2N167A. Transistor 275 is preferably a type 2N1306. Transistor 283 is preferably a type 2N1754, and transistors 309 and 311 are preferably type 2N1500.

The diodes 319 and 321 may illustratively be of the type SG221. Zener diodes 284 and 285 are preferably of the type 1N753A. Zener diode 270 is preferably of the type 653–C3. Inductors 289, 290 and 291 are preferably of about 100 μH.

Detailed circuitry has not been shown for either of the divider circuits 91 and 105 or for the gating circuit 107 or for the buffer and display circuitry 115. Circuits of this general type are well known in the art and may be of the form described, for instance, in the companion and co-pending application herein above identified.

Various modifications may be made in the circuitry described without in any respect departing from the spirit and scope of the disclosed invention. It will be understood that all indicated parameters are purely illustrative and for the purpose of a more ready understanding of the disclosed components.

Having now described the invention, what is claimed is:

1. Apparatus for producing signalling pulses indicative of phase departures of two electrical conditions which comprises means to generate a first series of oscillating signals at a selected frequency, means for changing the wave form characteristic of said first signal series by an amplitude change occurring during one cycle only in a constant and selected number of cycles of the generated signal series, means for generating a second series of oscillating signals normally of identical frequency characteristics to the first series of signals, means also to change the waveform characteristic of said second signal series by an amplitude change occurring during one cycle only in the same constant and selected number of cycles of the generated second series of oscillating signals, means for shifting the time of occurrence of the amplitude change in the one cycle of the second oscillating signal series relative to the amplitude change in the one cycle of the first signal series in each selected number of cycles to indicate mechanical angular changes, and means to convert the time separation of the amplitude changes in each oscillating signal series relative to the other to visible indications of said angular conditions.

2. Apparatus for indicating angular displacement changes between two driven components which comprise a first wave generator for generating an electrical wave of fixed and known frequency and having in each n cycles of repetition (n−1) cycles of substantially like amplitude and one cycle of substantially differing amplitude, a second generator for generating an electrical wave of a characteristic duplicating that of the first wave, means for fixedly maintaining the time at which each modified-amplitude cycle of the first wave occurs, means for controllably altering the time of occurrence of the modified-amplitude cycle of the second wave relative to the modified-amplitude cycle of the first electrical wave in accordance with a changing angular rotational position of a variable quantity to be measured, the change occurring to advance or retard the modified-amplitude cycle of the second electrical wave relative to the modified-amplitude cycle of the first electrical wave in accordance with changes between two quantities to be measured, and means to supply the developed electrical waves to a load circuit for indicating the conditions.

3. An electrical signalling wave generating apparatus which comprises a first generator to generate oscillating signals at a frequency proportional to a substantially constant driving speed and repeating after a known number of oscillation cycles in a selected repetition sequence, means for changing the wave form characteristic of a selected one cycle of each sequence of oscillations to distinguish the selected cycle from each other cycle of the sequence, a second generator substantially duplicating the first generator for generating oscillations at a rate and wave formation substantially identical to that of the first generator, means responsive to an angular shift of the driving speed for shifting the phase of the general oscillations of the second generator relative to the oscillations of the first generator to change the time of occurrence of the amplitude change in the second oscillating signal series relative to that of the first signal to indicate the mechanical angular change between the generators, and an output means to recover the separately produced signals thereby to provide indications of relative angular positions of the generators in accordance with the relative time of occurrence of the modified signals.

4. An electrostatic signalling wave generating apparatus which comprises a first rotor and stator combination, means to turn the rotor relative to the stator to generate oscillating signals as a frequency proportional to the relative rotational speed and repeating in a known cyclic repetition sequence, means for changing the amplitude characteristic of one cycle only of the sequence of oscillations produced by a 360° mechanical rotation of the rotor by developing an amplitude change in a single cycle only thereof, a second rotor and stator combination duplicating the first combination for developing electrical waves at a cyclic rate identical to that of the rotor of the first combination for generating a second oscillating signal series normally identical in characteristic to the first signals and also having in each signal sequence one wave cycle of different amplitude from each other cycle, means for shifting the angular position of the second stator element relative to its rotor and relative to the first stator element to change the time of occurrence of the amplitude change in the second oscillating signal series relative to the first signal to indicate the mechanical angular changes between the stators, and an output means to recover the separately produced signals thereby to provide indications of relative angular positions of the stator elements in accordance with the relative time of occurrence of the modified signals.

5. A signalling wave generating apparatus which comprises a driven first rotor and an associated stator combination to generate oscillating signals at a frequency proportional to the relative rotational speed and repeating following a selected number of oscillating cycles in a known repetition sequence, electromagnetic means for changing the wave form characteristics of at least one cycle of the sequence of oscillations produced by a mechanical rotation of the rotor of 360° by an amplitude change occurring in one cycle only of each sequence, a second driven rotor and an adjustable stator combination substantially duplicating the first combination for generating a second oscillating signal sequence normally identical in characteristic to the first signal sequence, means for shifting the angular position of the second stator element relative to its rotor and relative to the first stator element to change the time of occurrence of the amplitude change in the one cycle of change of the second oscillating signal sequence relative to the first signal to indicate the mechanical angular changes between the stators, and an output means to recover the separately produced signals thereby to provide indications of relative angular positions of the stator elements in accordance with the relative time of occurrence of the modified signals.

6. Signalling wave generating apparatus which comprises a rotor and stator combination, means to turn the rotor relative to the stator at a substantially constant rate of rotation to generate oscillating signals at a substantially constant frequency proportional to the rotational speed established between the rotor and stator and repeating in a known repetition sequence after each 360° rotor rotation, means for changing the wave form characteristic of one cycle only of the oscillating signals developed during each sequence by inducing an amplitude change in said one cycle relative to each other cycle in the sequence, a second rotor and stator combination substantially duplicating the first combination, means for turning the rotor element of the second combination at a rate identical to that of the rotor of the first combination for generating in combination with its stator a second oscillating signal sequence normally substantially identical in characteristic to the first signal, means for shifting the angular position of the second stator element relative to its associated rotor and relative to the first stator element to change the time of occurrence of the amplitude change in a similar cyclic sequence of the second oscillating signal relative to the first signal to indicate mechanical angular displacement changes between the stator elements, and an output means to recover the separately produced signals thereby to provide indications of relative angular positions of the stator elements in accordance with the relative time of occurrence of the amplitude-modified signals.

7. A wave generated device comprising a first and a second pair of rotors, a common support means for the pair of rotor elements whereby rotation of the support is adapted to rotate each rotor element at identical angular velocities, each rotor having thereon a like number of uniformly spaced serrations providing peripherally arranged teeth, means to support a stator element in concentric relationship to each of the rotor elements, the stator elements having peripherally arranged serrations of a number coinciding with the number on the associated rotor and with like angular spacing, means for supporting one of the stator elements in permanently fixed location relative to its associated rotor, means to support the other stator element relative to its rotor in an adjustable position to be movable with angular rotation clockwise and counterclockwise relative to its rotor, each of the stator and rotor elements having one of the peripherally arranged serrations missing thereby to provide one peripheral tooth of exaggerated length relative to the other peripheral teeth, means for electrically insulating the rotor and stator elements, means for supplying a charging voltage to each variable capacitor formed by the related rotor and stator combinations so that rotation of each rotor element relative to its associated stator is adapted, as a result of supplied charging current to the formed capacitor, to produce an amplitude-charging voltage wave which measures the rotor and stator teeth alignment and of which the amplitude at the instant of alignment of the elongated teeth of the stator and rotor elements exceeds that of the produced electrical wave for all other conditions during each rotor rotation, and means to supply the developed voltage wave to an output circuit.

8. Apparatus for indicating angular displacement changes between two driven components which comprise a first electrical wave generator for generating an electrical wave of fixed and known frequency which passes through $n$ cycles of oscillation repetition for any known and selected mechanical rotation and has $(n-1)$ cycles of substantially like amplitude and one cycle of accentuated amplitude, a second wave generator for generating an electrical wave of a characteristic duplicating that of the first wave, means for maintaining substantially constant the time in the cycle of $n$ oscillations at which the accentuated amplitude cycle of the first wave occurs, means for controllably altering the time of occurrence of the accentuated amplitude cycle of the second wave relative to the first in accordance with a changing angular rotational position of a variable quantity to be measured, the change occurring to advance or retard the accentuated cycle of the second wave relative to the first in accordance with a change between increasing and decreasing angular speeds, and means to supply the developed electrical waves to a load circuit for indicating the conditions.

9. The apparatus of claim 8 wherein each wave generator is an electrostatic component.

10. The apparatus of claim 8 wherein each generator comprises a plurality of capacitors of which one element is fixed and the other is rotatable and rotates relative to the fixed element to produce each wave form and comprising also means to provide a supplemental angular movement between the normally fixed element of the capacitor and its rotatable counterpart.

References Cited by the Examiner
UNITED STATES PATENTS 2,730,698    1/56    Daniels et al. _____ 340—347
2,930,033    3/60    Webb _____ 340—347

MALCOLM A. MORRISON, *Primary Examiner.*